United States Patent
Tong et al.

(10) Patent No.: US 8,054,898 B2
(45) Date of Patent: Nov. 8, 2011

(54) MULTI-USER MIMO SYSTEMS AND METHODS

(75) Inventors: Wen Tong, Ottawa (CA); Ming Jia, Ottawa (CA); Jianming Wu, Kanata (CA); Dong-Sheng Yu, Ottawa (CA); Peiying Zhu, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 525 days.

(21) Appl. No.: 12/089,938

(22) PCT Filed: Oct. 12, 2006

(86) PCT No.: PCT/CA2006/001665
§ 371 (c)(1),
(2), (4) Date: Apr. 11, 2008

(87) PCT Pub. No.: WO2007/041845
PCT Pub. Date: Apr. 19, 2007

(65) Prior Publication Data
US 2009/0316802 A1    Dec. 24, 2009

Related U.S. Application Data

(60) Provisional application No. 60/725,951, filed on Oct. 12, 2005.

(51) Int. Cl.
*H04L 27/28* (2006.01)
(52) U.S. Cl. ...................................... 375/260

(58) Field of Classification Search .................. 375/260, 375/130, 229, 347, 48, 349, 148; 370/236, 370/332
See application file for complete search history.

(56) References Cited

U.S. PATENT DOCUMENTS

| | | |
|---|---|---|
| 2005/0025254 A1 | 2/2005 | Awad et al. |
| 2005/0043031 A1 | 2/2005 | Cho et al. |
| 2005/0085195 A1 | 4/2005 | Tong et al. |
| 2006/0072508 A1* | 4/2006 | Zou et al. ...................... 370/332 |
| 2008/0132281 A1* | 6/2008 | Kim et al. .................. 455/562.1 |

FOREIGN PATENT DOCUMENTS

WO    WO03-085875    10/2003

* cited by examiner

*Primary Examiner* — Khai Tran
(74) *Attorney, Agent, or Firm* — Christopher & Weisberg, P.A.

(57) ABSTRACT

A method is provided for scheduling data transmission in a Multiple-Input Multiple-Output (MIMO) Orthogonal Frequency Division Multiplexing (OFDM) system. The MIMO-OFDM system may comprise at least one MIMO-OFDM transmitter and at least one MIMO-OFDM receiver. Feedback from one or more receivers may be used by a transmitter to improve quality, capacity, and scheduling in MIMO-OFDM communication systems. The method may comprise generating or receiving information pertaining to a MIMO channel metric and information pertaining to a Channel Quality Indicator (CQI) in respect of a transmitted signal; and sending a next transmission to a receiver using a MIMO mode selected in accordance with the information pertaining to the MIMO channel metric, and an adaptive coding and modulation selected in accordance with the information pertaining to the CQI.

26 Claims, 8 Drawing Sheets

| CQI | 1 | 2 | 3 | 4 | 5 | 6 | 7 | 8 | 9 | 10 |
|---|---|---|---|---|---|---|---|---|---|---|
| FEC Code | 1 | 2 | 3 | 4 | 5 | 3 | 4 | 5 | 3 | 4 |
| Modulation | 1 | 1 | 1 | 1 | 1 | 1 | 1 | 1 | 2 | 2 |
| STC Code | 1 | 1 | 1 | 1 | 1 | 2 | 2 | 2 | 2 | 2 |

FIG. 3A

| | Index | 1 | 2 | 3 | 4 | 5 |
|---|---|---|---|---|---|---|
| FEC | Codes Rate | R=1/5 | R=1/3 | R=1/2 | R=2/3 | R=4/5 |
| Modulation | Index | 1 | 2 | 3 | | |
| | Constellation | 4-QAM | 16-QAM | 64-QAM | | |
| STC | Index | 1 | 2 | | | |
| | Modes | STTD | BLAST | | | |

FIG. 3B

| CQI | 1 | 2 | 3 | 4 | 5 | 6 | 7 | 8 | 9 | 10 |
|---|---|---|---|---|---|---|---|---|---|---|
| FEC Code | 1 | 2 | 3 | 4 | 5 | 3 | 4 | 5 | 3 | 4 |
| Modulation | 1 | 1 | 1 | 1 | 1 | 1 | 1 | 1 | 2 | 2 |

| MIMOI | 1 | 2 | 3 | 4 | 5 | 6 | 7 | 8 | 9 | 10 |
|---|---|---|---|---|---|---|---|---|---|---|
| MIMO Format | 1 | 2 | 3 | 4 | 5 | 3 | 4 | 5 | 3 | 4 | ns
MULTI-USER MIMO SYSTEMS AND METHODS

This application claims the benefit of and is a National Phase Entry of International Application No. PCT/CA2006/001665 filed on Oct. 12, 2006, and claims the benefit of U.S. Provisional Application No. 60/725,951 filed on Oct. 12, 2005, which documents are both incorporated herein by reference in their entirety.

FIELD OF THE INVENTION

The invention relates to communication systems in general, and particularly to MIMO (multiple-input multiple-output) communication systems.

BACKGROUND

In a MIMO communication system, a transmitter transmits data through multiple transmitting antenna (NT) and a receiver receives data through multiple receiving antenna (NR). The binary data to be transmitted is usually divided between the transmitting antennae. Each receiving antenna receives data from all the transmitting antennae, so if there are M transmitting antennae and N receiving antennae, then the signal will propagate over M×N channels, each of which has its own channel response.

MIMO wireless communication systems are advantageous in that they enable the capacity of the wireless link between the transmitter and receiver to be improved compared with previous systems in the respect that higher data rates can be obtained. The multipath rich environment enables multiple orthogonal channels to be generated between the transmitter and receiver. Data can then be transmitted over the air in parallel over those channels, simultaneously and using the same bandwidth. Consequently, higher spectral efficiencies are achieved than with non-MIMO systems.

SUMMARY OF THE INVENTION

In some aspects of the present invention, a base station in a multi-user MIMO system selects a transmission method on the basis of feedback information received from a plurality of receivers.

In some aspects, the base station assigns a data rate and a MIMO mode suited to the channel quality for that user.

In some aspects, the present invention includes systems and methods which may compute MIMO channel metrics.

In some aspects, the present invention includes systems and methods which may include MIMO mode selection.

In some aspects, the present invention includes systems and methods which may assign/schedule MIMO user transmission and associated formats in order to maximize MIMO communication capacity.

In some aspects, the present invention includes systems and methods which may be used in conjunction with OFDM sub-channels.

In some aspects, the present invention includes systems and methods which use uplink (UL) channel sounding where MIMO matrices may be calculated on the transmission side.

According to one broad aspect of the present invention, there is provided a method in Multiple-Input Multiple-Output (MIMO) transmitter, the method comprising: a) generating or receiving information pertaining to a MIMO channel metric and information pertaining to a Channel Quality Indicator (CQI) in respect of a transmitted signal; b) sending a next transmission to a receiver using a MIMO mode selected in accordance with the information pertaining to the MIMO channel metric, and an adaptive coding and modulation selected in accordance with the information pertaining to the CQI.

According to another broad aspect of the present invention, there is provided a method in a MIMO receiver comprising: a) generating a MIMO channel metric and CQI of a received signal at the receiver; b) feeding back information pertaining to the MIMO channel metric and information pertaining to the CQI.

According to still another broad aspect of the present invention, there is provided a computer program product comprising a computer-readable medium storing instructions which, when executed by a processor, generate information pertaining to a MIMO channel metric and information pertaining to a CQI in respect of a transmitted signal; and instruct a transmitter to send a next transmission to a receiver using a MIMO mode selected in accordance with the information pertaining to the MIMO channel metric, and an adaptive coding and modulation selected in accordance with the CQI.

According to yet another broad aspect of the present invention, there is provided a system for processing signals received from a receiver comprising: an input for receiving the signals; and a processor configured to: generate or receive information pertaining to a MIMO channel metric and information pertaining to a CQI of the signals; select a MIMO mode based on the information pertaining to the MIMO channel metric and the information pertaining to the CQI.

Other aspects and features of the present invention will become apparent to those ordinarily skilled in the art upon review of the following description of the specific embodiments of the invention.

BRIEF DESCRIPTION OF THE DRAWINGS

The invention will now be described in greater detail with reference to the accompanying diagrams, in which:

FIG. 3A illustrates a lookup table for an embodiment of the invention in which a Forward Error Correction (FEC) code, a modulation type and a MIMO mode are selected based on a Channel Quality Indicator (CQI);

FIG. 3B illustrates a key table for FIGS. 3A and 4A;

DETAILED DESCRIPTION OF THE EMBODIMENTS

According to embodiments of the present invention, systems and methods are provided which enhance the performance of communication channels in a communication system, to thereby improve, for example, the transmission performance of multi-user MIMO communication systems.

In multi-user MIMO systems, a multi-data stream transmitter at a base transceiver station (BTS) that provides communication services for a coverage area or cell in a wireless communication system transmits communication signals to a plurality of user terminals via multiple antennas. User terminals are also commonly referred to as MIMO receivers, user equipment (UE), communication devices, and mobile stations, for instance. At a MIMO receiver side, multiple receive antennas are employed for each user.

Figure 1:
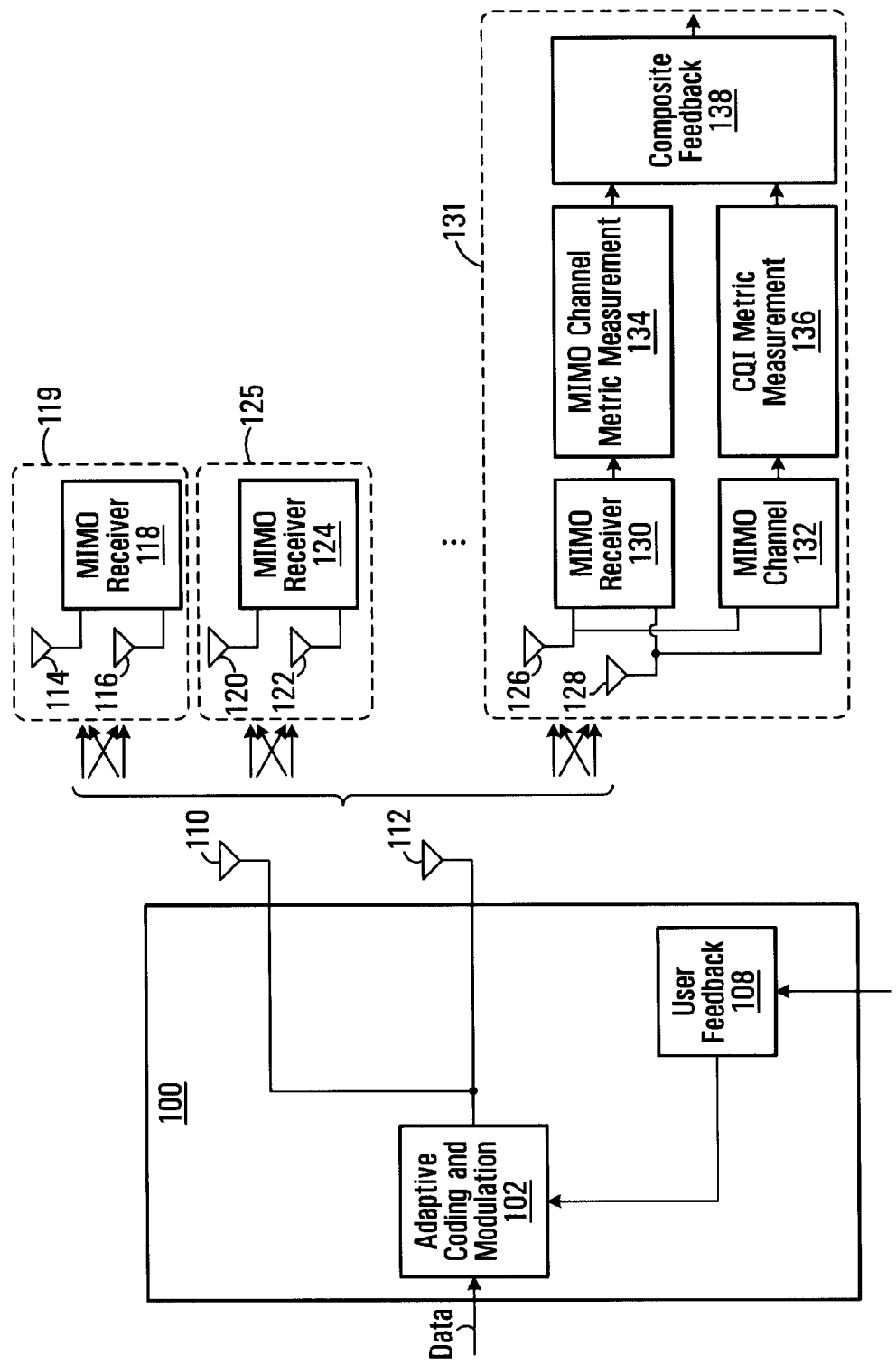
FIG. 1 is a block diagram of a multi-user MIMO system in accordance with an embodiment of the invention where channel measurements are calculated on the receive side.

FIG. 1 is a block diagram of a multi-user MIMO system in accordance with one embodiment of the invention. On the transmit side, the system of FIG. 1 includes a BTS 100 with an Adaptive Coding and Modulation Module 102, user feedback module 108, and a pair of antennas 110, 112. On the receive side, the system of FIG. 1 includes one or more user terminals 119, 125, 131 (three shown in the illustrated example) include respective MIMO receivers 118, 124, 130 each having a pair of antennas 114,116, 120,122, and 126,128 respectively.

In user terminal 131, antennas 126, 128 are both connected to the MIMO receiver 130 and to a MIMO channel module 132. MIMO channel module 132 represents the real world radio propagation channel. MIMO receiver 130 is connected to MIMO channel metric measurement module 134. MIMO channel module 132 is connected to CQI metric measurement module 136. Both MIMO channel metric measurement module 134 and CQI metric measurement module 136 are connected to composite feedback module 138. Composite feedback module 138 forms part of the feedback path from the receive side to the transmit side. Information regarding the MIMO channel metric and the CQI metric is transmitted from MIMO channel metric measurement module 134 and CQI metric measurement module 136 respectively to composite feedback module 138 which incorporates one or more lookup tables to determine a MIMO mode and data rate. The MIMO mode and data rate are fed back by composite feedback module 138 to BTS 100 by any convenient communications method, which may or may not comprise wireless communications.

Each of user terminal 119 and user terminal 125 also include channel measurement modules as well (i.e. each have their own modules equivalent to MIMO channel module 132, MIMO channel metric measurement module 134, CQI metric measurement module 136, and composite feedback module 138). These modules, which are connected to each of MIMO receiver 118 and MIMO receiver 124, have been intentionally omitted to simplify FIG. 1.

The system of FIG. 1 operates as follows. Pilot data is input into adaptive coding and modulation module 102 where such pilot data is converted into communication signals which may then be transmitted via the antennas 110,112 from the BTS 100 to user terminals 119, 125 and 131. In some embodiments, the pilots are inserted on each antenna in a manner that makes them distinguishable at a receiver. For example, for OFDM implementations, a respective set of sub-carrier and OFDM symbol durations can be employed for each antenna.

At MIMO receivers 118, 124, and 130, each of the antennas 114,116, 120,126, and 126,128 receive the pilot signals transmitted from the antennas 110,112. MIMO receiver 130 processes the received signals to produce separated layer signals which are fed to MIMO channel metric measurement module 134. The MIMO channel measurement metric measurement module 134 processes the received pilot data having regard to knowledge of what the transmitted pilot data was, and produces a MIMO channel metric. Specific examples of calculations which may be performed to assesses a MIMO channel metric are described below. MIMO channel module 132 processes the received signal to produce MIMO channel state information which is fed to the CQI measurement module 136. The CQI metric measurement module processes the received pilot data having regard to knowledge of what the transmitted pilot data was, produces a CQI metric. CQI metrics are well known and may for example include CINR (carrier to interference and noise ratio), and the rank of the MIMO channel.

The CQI metric is used as a basis for selecting a particular coding and modulation. BTS 100 can adjust the modulation order and/or coding rate in accordance with the CQI metric. More particularly, the data transmission rate can be increased, decreased, maintained at a constant level, or reduced to 0 bits/s. In a particular example, the CQI is CINR as indicated above, and each range of CINR is associated with a respective adaptive coding and modulation.

In some embodiments, MIMO receivers 118, 124 and 130 track the channel quality via the pilot symbols received and accumulate these quality measurements over a period of time to produce the CQI.

In some embodiments, the feedback from user terminals 119, 125, 131 may also include information identifying the receiver's MIMO capability. For example, this might indicate a number of receive antennas, or the rank of the MIMO channel.

The MIMO channel metric is used to select a MIMO transmission mode to be used for transmitting to a particular user terminal. The particular MIMO modes that are available are selected on an implementation specific basis. Four examples of MIMO modes include beamforming, BLAST, space-time transmit diversity (STTD), and spatial multiplex, though the invention is in no way limited to these MIMO modes and is in fact applicable to all possible space-time mapping.

Those skilled in the art will appreciate that MIMO channel metric measurement and CQI metric measurement may be performed by a digital signal processor (DSP) or a general-purpose processor adapted to execute signal processing software, for example. Various techniques for determining such metric measurements will be apparent to those skilled in the art.

Both the MIMO channel metric and the CQI is transmitted to composite feedback module 138 where one or more lookup tables may be used to determine a composite metric used by BTS 100 to select a MIMO mode and data rate. As used herein, "composite" can be equated to the "overall" quality of the channel matrix. The lookup carried out by composite feedback module 138 is used for two purposes: (i) User terminal pairing, i.e. scheduling. The more orthogonal the channel, the larger the MIMO capacity; and (ii) together with SNR, the lookup is used for MIMO mode and coding and modulation selection. With a higher SNR and composite metric, spatial multiplexing and higher modulation and coding rates may be selected. With a lower SNR and composite metric, transmit and lower modulation and coding rates may be selected.

Note that the composite metric does not affect modulation and coding rates selection in transmit diversity, but it affects modulation and coding rates selection in spatial multiplexing. This is because when the composite metric is low, more inter-layer interference will occur, and hence only lower modulation and coding rates are to be used.

The composite metric is then transmitted by composite feedback module 138 to BTS 100 through user feedback module 108. With the composite metric received from composite feedback module 138, a scheduler which forms part of BTS 100 determines a MIMO transmission mode and a modulation and coding to be used for each MIMO receiver. In some embodiments, the BTS 100 indicates the transmission format to each MIMO receiver.

In some embodiments, a two bit composite metric is used, with one bit of the composite metric being used to indicate the CQI, and one bit of the composite metric to indicate the MIMO mode, e.g. transmit diversity or spatial multiplexing. In the spatial multiplexing mode, one additional bit can be used to indicate if the MIMO channel is orthogonal.

Figure 2:
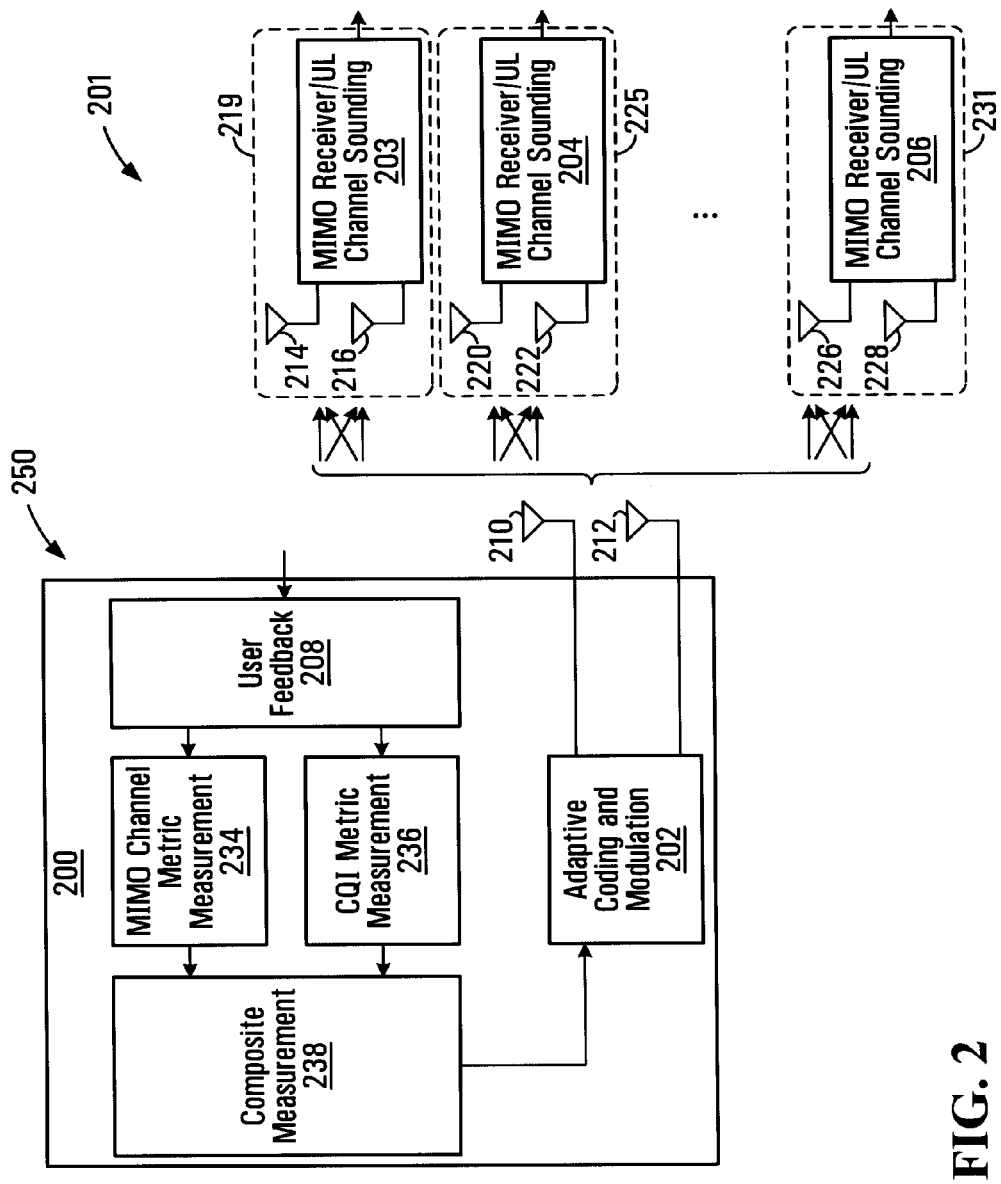
FIG. 2 is a block diagram of a multi-user MIMO system in accordance with an embodiment of the invention where channel measurements are calculated on the transmission side.

FIG. 2 is an alternative embodiment to that illustrated in FIG. 1. In this embodiment, channel metrics are measured at the transmit side 250 rather than the receiver side 201. On the transmit side 250, the system of FIG. 2 includes a BTS 200 with an Adaptive Coding and Modulation Module 202, user feedback module 208, and a pair of antennas 210,212. On the receive side 201, the system of FIG. 2 includes one or more user terminals 219, 225, 231 (three shown in the illustrated example) include respective MIMO receivers 203, 204, 206 each having a pair of antennas 214,216, 220,222, and 226,228 respectively.

In user terminals 219, 225, and 231, antennas 214,216, 220,222, and 226,228 respectively are connected to MIMO receivers 203, 204, and 206 which each perform UL channel sounding. In the case of Time Division Duplex (TDD), channel sounding is used to allow BTS 200 to perform channel measurements at the transmit side 250 rather than the receiver side 201. Information received from MIMO receivers 203, 204, and 206 is fed back through a feedback control channel to user feedback module 208 at BTS 200 by any convenient communications method, which may or may not comprise wireless communications.

User feedback module 208 is connected to both MIMO channel metric measurement module 234 and CQI metric measurement module 236. Both MIMO channel metric measurement module 234 and CQI metric measurement module 236 are connected to composite feedback module 238. Composite feedback module 238 is connected to adaptive coding and modulation module 202.

Except for the fact that channel measurements are performed at the transmit side 250 rather than the receive side 201, the operation of the system of FIG. 2 is otherwise similar to the operation of the system of FIG. 1. The main difference is that through channel sounding, user terminals 219, 225, and 231 pass the burden of channel measurements and processing to BTS 200.

Of course, the systems of FIGS. 1 and 2 are only two illustrative examples of systems in which the invention may be implemented. The invention is in no way limited thereto. Extension of the principles of the present invention to systems having other dimensions will be apparent to those skilled in the art. In particular, the number of user terminals that will be present in a given implementation may differ, and may vary over time if they are mobile. The number of antennas on the base station and user terminals is two in the illustrated example. More generally, any number, two or more, of antennas can be employed such that MIMO communications are possible, though the number of receive antennas must be greater than to equal to the number of data streams (i.e. layers) being transmitted. Both the base station and user terminals include functionality not shown as would be understood to one of skill in the art. Separate components are shown for each of the MIMO channel 132,232, MIMO channel metric measurement module 134,234, the CQI metric measurement module 136,236, and the composite feedback module 138, 238. More generally, the functions provided by these modules may be combined in one or more functional elements, and these may be implemented in one or a combination of software, hardware, firmware etc.

A MIMO system can be expressed as $$\bar{y} = H\bar{s} + \bar{\eta},$$

where $\bar{y} = [y_1 \ y_2 \ \ldots \ y_N]^T$ is a vector of communication signals received at a receiver;

$\bar{s} = [s_1 \ s_2 \ \ldots \ s_M]^T$ is a vector of communication signals transmitted by a transmitter;

$\bar{\eta} = [\eta_1 \ \eta_2 \ \ldots \ \eta_N]^T$ is a vector of noise components affecting the transmitted communication signals;

$$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{N1} & h_{N2} & \ldots & h_{NM} \end{bmatrix}$$

is a channel matrix of communication channel attenuation factors;

N is a number of antennas at the receiver; and
M is a number of antennas at the transmitter.
For a [2Tx, 2Rx] MIMO channel, $$H = \begin{bmatrix} h_{11} & h_{12} \\ h_{21} & h_{22} \end{bmatrix}$$

The eigenvalue of $H^H H$ are $\lambda \text{max}$, $\lambda \text{min}$.

There are several scheduling approaches, including orthogonality and capacity. These approaches are for user terminal pairing only.

Where it is desired that scheduling by a BTS (such as BTS 100 and BTS 200 in FIGS. 1 and 2 respectively) be provided on the basis of maximum orthogonality, the following MIMO channel metric will be computed by, for example, MIMO channel metric measurement module 134 in FIG. 1:

$$\max \left\{ \frac{\det(H^H H)}{\text{trace}(H^H H)} \right\}$$

The larger the metric, the more orthogonal is the channel.

For a maximum orthogonality decomposition scheduling scheme, $$\min \left\| [h_{11} \ h_{21}] \begin{bmatrix} h_{12}^* \\ h_{22}^* \end{bmatrix} \right\| = 0$$

In this case, the channel is completely orthogonal, yielding two separate spatial channels, with channel attenuation factors being $\sqrt{|h_{11}|^2 + |h_{21}|^2}$ and $\sqrt{|h_{12}|^2 + |h_{22}|^2}$ respectively.

For scheduling based on a best conditional number of MIMO channel scheme, the following channel metric will be calculated by, for example, MIMO channel metric measurement module 134 in FIG. 1:

$$\rho = \lambda \text{max} / \lambda \text{min} \sim 1$$

In this case, an advanced receiver (maximum likelihood detection) and/or a simplified receiver can be employed.

For scheduling based on maximum capacity, the following metric will be calculated by, for example, MIMO channel metric measurement module 134 in FIG. 1:

$$\det(H^H H)$$

Maximum capacity scheduling is also maximum CQI scheduling.

For scheduling based on maximum orthonogality for several MIMO channels, $$H_1 = \begin{bmatrix} h_{11} & h_{12} \\ h_{21} & h_{22} \end{bmatrix}$$

$$H_2 = \begin{bmatrix} h_{11} & h_{12} \\ h_{21} & h_{22} \end{bmatrix}$$

the following metric will be calculated by, for example, MIMO channel metric measurement module 134 in FIG. 1:

$$\max\left\{\sum_{i=1}^{2} \frac{\det(H_i^H H_i)}{\operatorname{trace}(H_i^H H_i)}\right\}$$

For scheduling based on orthogonality capacity for several MIMO channels, the following metric will be calculated by, for example, MIMO channel metric measurement module 134 in FIG. 1:

$$\max\left\{\sum_{i=1}^{2} \det(H_i^H H_i)\right\}$$

For scheduling based on a combined conditional number for several MIMO channels, the following metric will be calculated by, for example, MIMO channel metric measurement module 134 in FIG. 1:

$$\min\left\{\sum_{i=1}^{2} \rho_i\right\}$$

For scheduling based on a SNR weighted maximum orthogonality scheme for several MIMO channels, the following metric will be calculated by, for example, MIMO channel metric measurement module 134 in FIG. 1:

$$\max\left\{\sum_{i=1}^{2} SNR_i \frac{\det(H_i^H H_i)}{\operatorname{trace}(H_i^H H_i)}\right\}$$

For scheduling based on a SNR weighted capacity scheme for several MIMO channels, the following metric will be calculated by, for example, MIMO channel metric measurement module 134 in FIG. 1:

$$\max\left\{\sum_{i=1}^{2} SNR_i \det(H_i^H H_i)\right\}$$

For scheduling based on a SNR weighted combined conditional number scheme for several MIMO channels, the following metric will be calculated by, for example, MIMO channel metric measurement module 134 in FIG. 1:

$$\min\left\{\sum_{i=1}^{2} SNR_i \rho_i\right\}$$

FIG. 3A illustrates a table setting out one representative example of a lookup table for selecting coding modulation and MIMO modes based CQI which can be used in accordance with one embodiment of the invention. The table in FIG. 3B provides a key for the table in FIG. 3A.

In the table of FIG. 3A, Row 1 lists possible CQIs, which in this case would be from 1 to 10. Each CQI has an associated FEC code, an associated modulation, and an associated MIMO mode, in this case an STC code. In the particular example, illustrated, there are five available FEC codes, three available modulations, and two available STC codes.

The key shown in FIG. 3B indicates the code rates ⅕, ⅓, ½, ⅔, ⅘ associated with the five available FEC codes, indicates the modulation constellations 4-QAM, 16-QAM 64-QAM associated with the three modulations, and indicates the STC modes STTD and BLAST associated with the two available STC modes.

FIG. 3A shows how CQI, together with STC code rate, determines the proper code and modulation set. The table in FIG. 3A is of course just one possible example of a lookup table. The particular MIMO modes, FEC codes, and modulations supported will vary on an implementation specific basis. The invention is in no way limited thereto. Extension of the principles of the present invention to others possible lookup tables will be apparent to those skilled in the art. For example, other forms of lookup tables could be employed which include other standard modulation schemes such as Phase-shift keying (PSK), and other forms of MIMO modes such as beamforming.

Figures 4A, 4B, 5:
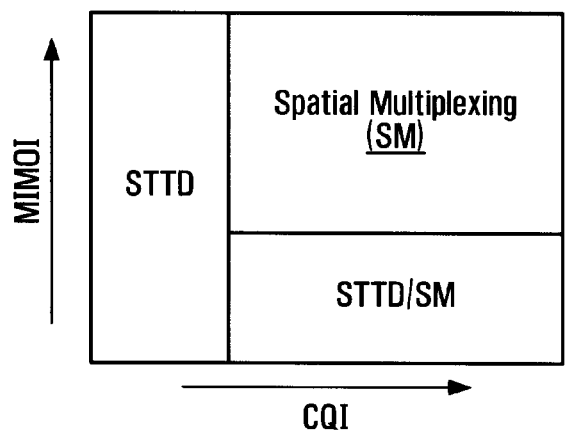
FIG. 4A illustrates a lookup table for another embodiment of the invention in which a Forward Error Correction (FEC) code and a modulation type are selected based on a CQI.
FIG. 4B illustrates a lookup table for a MIMO mode based on a MIMO indicator (MIMOI)
FIG. 5 is a diagram illustrating a graphical lookup for a MIMO mode based on a MIMOI and a CQI.

FIGS. 4A and 4B illustrate a lookup table in which the CQI and MIMOI are fed back in separate feedback components. In this case, the MIMO mode is determined by both CQI and MIMOI.

FIG. 4A sets out one example for coding modulation based on CQI. Row 1 lists possible CQIs which may be calculated by CQI metric measurement module 136, from 1 to 10. Row 2 lists Forward Error Correction Codes (FEC), which in this case are from 1 to 5. Row 3 lists three possible forms of modulation which can be implemented in accordance with this lookup table, namely 4-QAM, 16-QAM, and 64-QAM. Reference may be had to the table in FIG. 3B which provides a key for the table in FIG. 4A.

FIG. 4B is a lookup table for MIMO modes based on a MIMO indicator (MIMOI). MIMO indicator may be calculated by MIMO channel metric measurement module 134 shown in FIG. 1. In this case, Row 1 lists possible MIMO indicators from 1 to 10 which are selected based on the result of the channel metric calculations. Row 2 lists possible MIMO formats (which could represent, e.g. BLAST, STTD, beamforming, spatial multiplexing, etc.) from 1 to 5.

FIGS. 4A and 4B show that the higher the CQI/MIMOI, the higher is the modulation order and FEC coding rates. There are two situations where a composite metric of both CQI and MIMOI may be used: the first is MIMO mode selection, because when MIMOI is low, SM may not be used even with a large CQI. FIG. 8 shows that at low MIMOI, in the high CQI region, the use of STTD or SM as a MIMO mode depends on MIMOI. However, in the same CQI region, when MIMOI is larger, SM is selected. Another situation is modulation and code set selection in SM, because in SM, MIMOI indicates inter-layer interference, and hence indicates the performance of the channel. Given the same CQI, modulation and code set will depends on the MIMO indicator. In other words, modulation and code set will be determined by two parameters: CQI and MIMOI.

As with the table in FIG. 3A, the tables in FIGS. 4A and 4B are merely illustrative examples of lookup tables which could be used in accordance with the invention. Persons skilled in the art will appreciate that other combinations of parameters can be employed.

FIG. 5 is a diagram illustrating another example of a lookup for MIMO modes based on a MIMO indicator and a CQI. As noted above, a MIMOI may be ascertained by calculations performed by MIMO channel metric measurement module 134 shown in FIG. 1 and CQI may be calculated by CQI metric measurement module 136 also shown in FIG. 1.

In FIG. 5, three sections are shown, a first section labelled "STTD", a second section labelled "spatial multiplexing (SM), and a third section labelled "STTD/SM". According to the lookup of FIG. 5, for low CQIs (i.e. low channel quality), regardless of the MIMO indicator, STTD should be chosen as the MIMO format. For high MIMO indicators and high CQIs, the lookup of FIG. 5 indicates that spatial multiplexing should be chosen as the MIMO format. For a low MIMO indicator and high CQI, either of STTD and spatial multiplexing can be selected as the MIMO format.

For the example of FIG. 5, a CQICH (channel quality indicator channel) can be used to feedback coding/modulation information and/or selection, and a single bit can be used to flag the MIMO mode. One of '0' or '1' can be used for STTD, and the other of '0' or '1' can be for SM.

FIG. 5 is of course just one possible example of a lookup in which the invention may be implemented. The invention is in no way limited thereto. Extension of the principles of the present invention to other lookup diagrams will be apparent to those skilled in the art.

Figure 6:
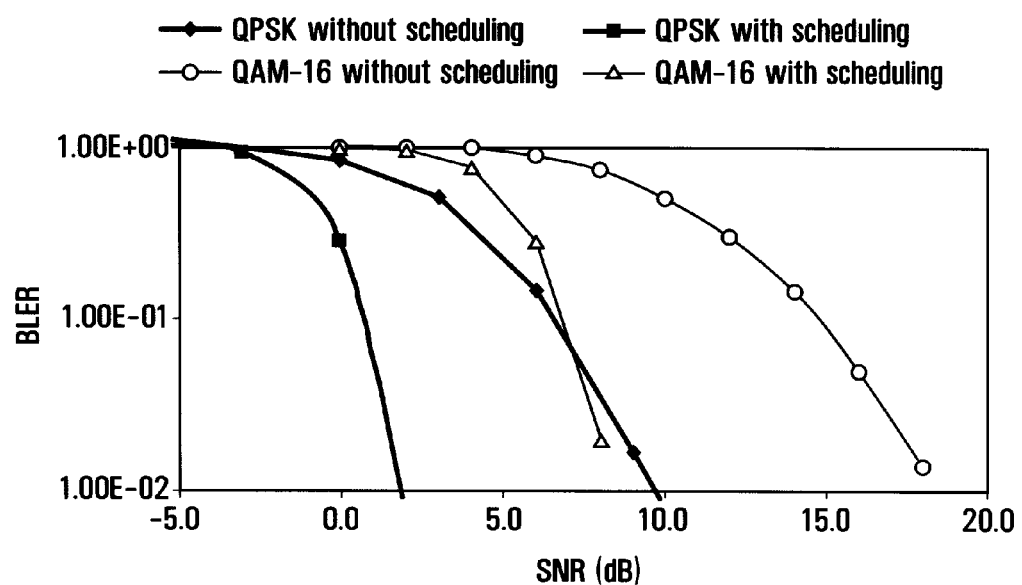
FIG. 6 is a plot of BLER (Block Error Rate) versus Signal-to-Noise Ratio (SNR) for an embodiment of the invention.
Figure 7:
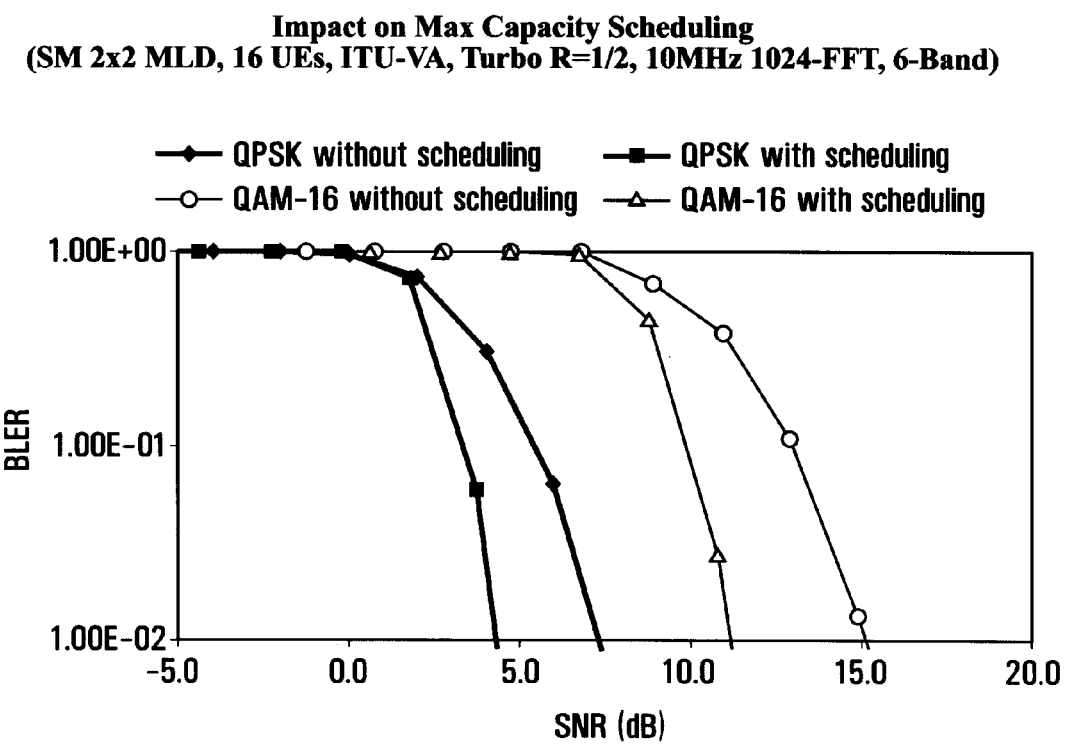
FIG. 7 is a plot of BLER (Block Error Rate) versus SNR for another embodiment of the invention.

FIG. 6 is a plot of BLER (Block Error Rate) versus SNR (Signal-to-Noise Ratio) for an embodiment of the invention. FIG. 6 shows the impact on maximum capacity scheduling. FIG. 7 is a plot of BLER (Block Error Rate) versus SNR (Signal-to-Noise Ratio) for another embodiment of the invention. FIG. 7 shows the impact on maximum capacity scheduling. Both FIGS. 6 and 7 shows two sets of curves, namely, "without scheduling" and "with scheduling". More particularly, without scheduling" means "random scheduling", and "with scheduling" means "orthogonality based scheduling".

Figure 8A:
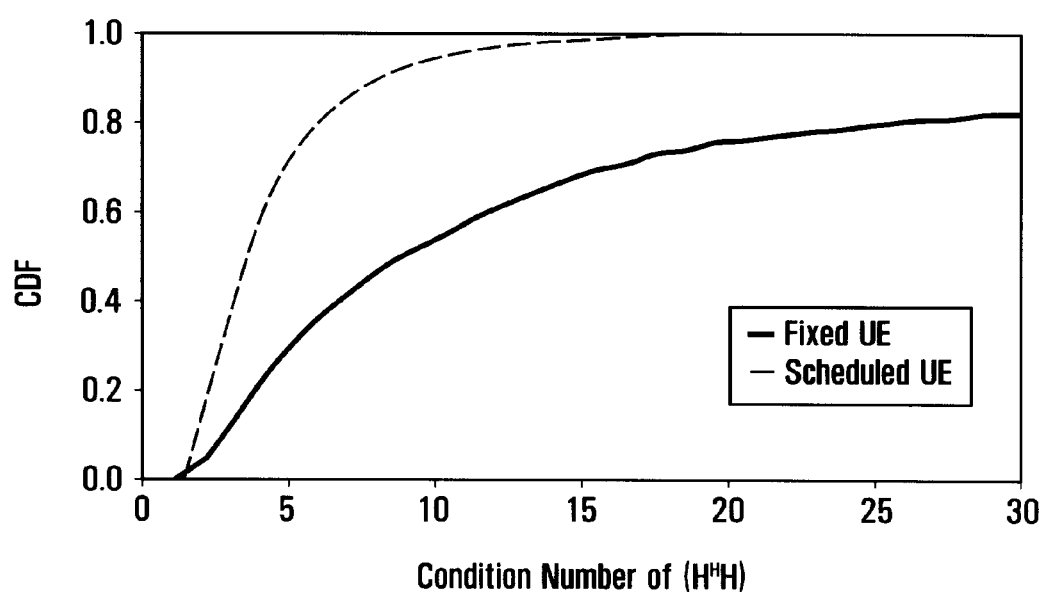
FIG. 8A is a plot of Cumulative Distribution Function (CDF) versus condition number of $H^H H$ for an embodiment of the invention.

FIG. 8A is a plot of Cumulative Distribution Function (CDF) versus condition number of $H^H H$ for an embodiment of the invention. $H^H H$ means Hermitian transform, i.e. conjugate transposition. FIG. 8A presents the impact on minimum conditional number scheduling. FIG. 8A shows the CDF of the composite metric when random pairing is used (the solid line) and when the orthogonality based pairing is used.

Figure 8B:
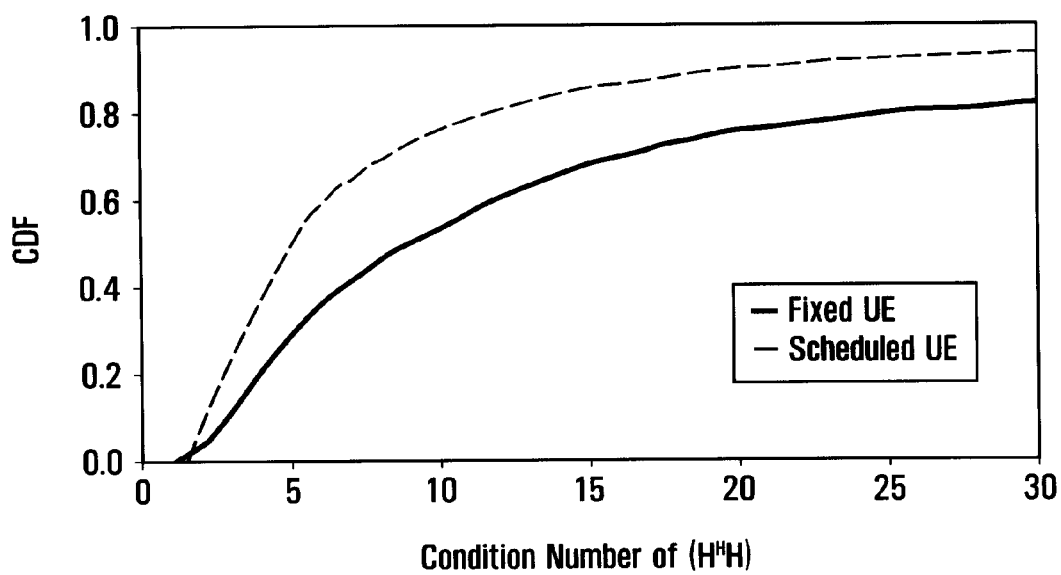
FIG. 8B is a plot of CDH versus $H^H H$ for another embodiment of the invention.

FIG. 8B is a plot of CDH versus (HHH) for another embodiment of the invention. FIG. 8B presents the impact on minimum conditional number scheduling.

Numerous modifications and variations of the present invention are possible in light of the above teachings. It is therefore to be understood that within the scope of the appended claims, the invention may be practiced otherwise than as specifically described herein.

We claim:

1. A method in a Multiple-Input Multiple-Output (MIMO) transmitter, the method comprising:
   a) receiving from a receiver a composite metric based on information pertaining to a MIMO channel metric and information pertaining to a Channel Quality Indicator (CQI) in respect of a transmitted signal, the composite metric specifying the CQI, and a MIMO mode;
   b) sending a next transmission to a receiver using a MIMO mode selected in accordance with the composite metric, and an adaptive coding and modulation selected in accordance with the composite metric.

2. The method of claim 1, wherein the composite metric serves as a basis for selecting between at least two MIMO modes selected from a group consisting of: BLAST, STTD, beamforming, and spatial multiplexing, and other space-time mapping schemes.

3. The method of claim 1, wherein the MIMO transmitter is a MIMO Orthogonal Frequency Division Multiplexing (MIMO-OFDM) transmitter.

4. The method of claim 1, further comprising:
   receiving from a receiver MIMO capability information indicating MIMO capabilities of the receiver.

5. The method of claim 1, wherein the composite metric further specifies whether a MIMO channel is orthogonal.

6. The method of claim 1, further comprising selecting and scheduling one or more transmit antennas at the MIMO transmitter for data transmission to a given receiver based on the composite metric.

7. The method of claim 1, wherein the MIMO channel metric is determined by one of $$\max\left\{\frac{\det(H^H H)}{\text{trace}(H^H H)}\right\},$$

$$\det(H^H H),$$

$$\max\left\{\sum_{i=1}^{2}\frac{\det(H_i^H H_i)}{\text{trace}(H_i^H H_i)}\right\},$$

$$\max\left\{\sum_{i=1}^{2}\det(H_i^H H_i)\right\},$$

$$\min\left\{\sum_{i=1}^{2}\rho_i\right\},$$

$$\max\left\{\sum_{i=1}^{2} SNR_i \frac{\det(H_i^H H_i)}{\text{trace}(H_i^H H_i)}\right\},$$

$$\max\left\{\sum_{i=1}^{2} SNR_i \det(H_i^H H_i)\right\}, \text{ and}$$

$$\min\left\{\sum_{i=1}^{2} SNR_i \rho_i\right\}$$

where H is a matrix of the channel state information, $H_i$ is a matrix of the channel state information for the $i_{th}$ resource block, $\rho_i = \lambda\max_i/\lambda\min_i$ for each $H_i$, and $SNR_i$ is the Signal to Noise Ratio for each $H_i$.

8. The method of claim 1, wherein, at the transmitter, the composite metric is used to affect the modulation and coding rates only if the MIMO mode is one of spatial multiplexing.

9. A method in a MIMO receiver, the method comprising:
   a) generating a MIMO channel metric and CQI of a received signal at the receiver; and
   b) feeding back information pertaining to the MIMO channel metric and information pertaining to the CQI in the form of a composite metric that specifies the CQI and a MIMO mode.

10. The method of claim 9, wherein the MIMO channel metric is determined by one of $$\max\left\{\frac{\det(H^H H)}{\operatorname{trace}(H^H H)}\right\},$$

$$\det(H^H H),$$

$$\max\left\{\sum_{i=1}^{2} \frac{\det(H_i^H H_i)}{\operatorname{trace}(H_i^H H_i)}\right\},$$

$$\max\left\{\sum_{i=1}^{2} \det(H_i^H H_i)\right\},$$

$$\min\left\{\sum_{i=1}^{2} \rho_i\right\},$$

$$\max\left\{\sum_{i=1}^{2} SNR_i \frac{\det(H_i^H H_i)}{\operatorname{trace}(H_i^H H_i)}\right\},$$

$$\max\left\{\sum_{i=1}^{2} SNR_i \det(H_i^H H_i)\right\}, \text{ and}$$

$$\min\left\{\sum_{i=1}^{2} SNR_i \rho_i\right\}$$

where H is a matrix of the channel state information, $H_i$ is a matrix of the channel state information for the $i_{th}$ resource block, $\rho_i = \lambda \max_i / \lambda \min_i$ for each $H_i$, and $SNR_i$ is the Signal to Noise Ratio for each $H_i$.

11. The method of claim 9, wherein the information pertaining to the MIMO channel metric selects serves as the basis for selecting between at least two MIMO modes selected from a group consisting of: BLAST, STTD, beamforming, spatial multiplexing, and other space-time mapping schemes.

12. The method of claim 9, wherein a MIMO mode is selected on the basis that:
   i. when the CQI indicates a low channel quality, the MIMO mode is selected to be a space time block code regardless of the information pertaining to the channel metric;
   ii. when the information pertaining to the CQI indicates a high channel quality and the information pertaining to the channel metric is high, the MIMO mode is selected to be spatial multiplexing, and
   iii. when the information pertaining to the CQI indicates a high channel quality and the information pertaining to the channel metric is low, the MIMO mode is selected to be one of a space time block code and a spatial multiplex mode.

13. The method of claim 9, wherein the composite metric further indicates an orthogonality of a MIMO channel.

14. The method of claim 9, further comprising selecting a MIMO mode in accordance with the composite metric, and an adaptive coding and modulation selected in accordance with the composite metric.

15. The method of claim 9, further comprising using the information pertaining to the MIMO channel metric and the information pertaining to the CQI to determine the composite metric from a lookup table in the receiver.

16. A computer program product comprising a computer-readable medium storing instructions which, when executed by a processor, causes a MIMO transmitter to receive from a receiver a composite metric based on information pertaining to a MIMO channel metric and information pertaining to a CQI in respect of a transmitted signal, the composite metric specifying a CQI and a MIMO mode; and
   causes a MIMO transmitter to send a next transmission to a receiver using a MIMO mode selected in accordance with the composite metric, and an adaptive coding and modulation selected in accordance with the composite metric.

17. The computer program product of claim 16, wherein the composite metric selects between at least two MIMO modes selected from a group consisting of: BLAST, STTD, beamforming, spatial multiplexing, and other space-time mapping schemes.

18. The computer program product of claim 16, wherein the MIMO transmitter is a MIMO Orthogonal Frequency Division Multiplexing (MIMO-OFDM) transmitter.

19. The computer program product of claim 16, further comprising instructions which, when executed by a processor cause the processor to select and schedule one or more transmit antennas at the MIMO transmitter for data transmission to a given receiver based on the composite metric.

20. The computer program product of claim 16, wherein the MIMO channel metric is determined by one of $$\max\left\{\frac{\det(H^H H)}{\operatorname{trace}(H^H H)}\right\},$$

$$\det(H^H H),$$

$$\max\left\{\sum_{i=1}^{2} \frac{\det(H_i^H H_i)}{\operatorname{trace}(H_i^H H_i)}\right\},$$

$$\max\left\{\sum_{i=1}^{2} \det(H_i^H H_i)\right\},$$

$$\min\left\{\sum_{i=1}^{2} \rho_i\right\},$$

$$\max\left\{\sum_{i=1}^{2} SNR_i \frac{\det(H_i^H H_i)}{\operatorname{trace}(H_i^H H_i)}\right\},$$

$$\max\left\{\sum_{i=1}^{2} SNR_i \det(H_i^H H_i)\right\}, \text{ and}$$

$$\min\left\{\sum_{i=1}^{2} SNR_i \rho_i\right\}$$

where H is a matrix of the channel state information, $H_i$ is a matrix of the channel state information for the $i_{th}$ resource block, $\rho_i = \lambda \max_i / \lambda \min_i$ for each $H_i$, and $SNR_i$ is the Signal to Noise Ratio for each $H_i$.

21. The computer program product of claim 16, wherein the composite metric has a first bit to specify CQI and a second bit to specify a MIMO mode.

22. A system for processing signals received from a receiver comprising:

an input for receiving the signals; and
a processor configured to:
receive a composite metric based on information pertaining to a MIMO channel metric and information pertaining to a CQI of the signals, the composite metric specifying the CQI and a MIMO mode; and
select a MIMO mode based on the composite metric.

23. The system of claim 22 comprising a MIMO Orthogonal Frequency Division Multiplexing (MIMO-OFDM) transmitter, the MIMO Orthogonal MIMO-OFDM transmitter comprising the processor.

24. The system of claim 22, wherein the processor uses the composite metric to select between at least two MIMO modes selected from a group consisting of: BLAST, STTD, beamforming, spatial multiplexing, and other space-time mapping schemes.

25. The system of claim 23, wherein the processor is further configured to select and schedule one or more transmit antennas at the MIMO-OFDM transmitter for data transmission to a given receiver based on the information pertaining to the MIMO channel metric and information pertaining to the CQI.

26. The system of claim 22, wherein the MIMO channel metric is determined by one of $$\max\left\{\frac{\det(H^H H)}{\text{trace}(H^H H)}\right\},$$

$\det(H^H H),$ $$\max\left\{\sum_{i=1}^{2} \frac{\det(H_i^H H_i)}{\text{trace}(H_i^H H_i)}\right\},$$

$$\max\left\{\sum_{i=1}^{2} \det(H_i^H H_i)\right\},$$

$$\min\left\{\sum_{i=1}^{2} \rho_i\right\},$$

$$\max\left\{\sum_{i=1}^{2} SNR_i \frac{\det(H_i^H H_i)}{\text{trace}(H_i^H H_i)}\right\},$$

$$\max\left\{\sum_{i=1}^{2} SNR_i \det(H_i^H H_i)\right\}, \text{ and}$$

$$\min\left\{\sum_{i=1}^{2} SNR_i \rho_i\right\}$$

where H is a matrix of the channel state information, $H_i$ is a matrix of the channel state information for the $i_{th}$ resource block, $\rho_i = \lambda \max_i / \lambda \min_i$ for each $H_i$, and $SNR_i$ is the Signal to Noise Ratio for each $H_i$.

* * * * *

UNITED STATES PATENT AND TRADEMARK OFFICE
CERTIFICATE OF CORRECTION

PATENT NO. : 8,054,898 B2  
APPLICATION NO. : 12/089938  
DATED : November 8, 2011  
INVENTOR(S) : Wen Tong et al.

Page 1 of 1

It is certified that error appears in the above-identified patent and that said Letters Patent is hereby corrected as shown below:

In Column 11, line 43, Claim 11, delete "selects".

Signed and Sealed this  
Thirteenth Day of December, 2011

David J. Kappos  
*Director of the United States Patent and Trademark Office*